March 14, 1944. F. E. KOCHENDERFER ET AL 2,344,045

VALVE WHEEL

Filed Aug. 29, 1942

Inventor
Frank E. Kochenderfer
By Clarence V. Shriver
Glenn L. Fish Attorney

Patented Mar. 14, 1944

2,344,045

UNITED STATES PATENT OFFICE 2,344,045

VALVE WHEEL

Frank E. Kochenderfer and Clarence V. Shriver, Spokane, Wash.

Application August 29, 1942, Serial No. 456,684

1 Claim. (Cl. 74—552)

This invention relates to hand wheels of the type employed for turning valves and the like. These wheels are customarily formed of brass or bronze but, at the present time, these metals are difficult to obtain and it is, therefore, one object of the invention to provide a hand wheel which may be formed of a substitute metal such as steel and still have the strength necessary to withstand strains exerted during opening and closing of a valve.

Another object of the invention is to provide a valve wheel having a rim formed of a metal tube having its ends strongly united by a welded joint, the welded ends being so formed that one fits within the other and is braced against transverse movement which might rupture the weld.

Another object of the invention is to provide the wheel with metal spokes welded at their ends to the rim and the hub of the wheel and substantially semicircular in cross section, side edge portions of the spokes being turned inwardly to impart added strength to the spokes and eliminate sharp or rough side edges.

Another object of the invention is to so form outer ends of the spokes that they will be flared and thus provided with increased areas which are welded to the rim and firmly held in engagement with the rim.

Another object of the invention is to provide a valve wheel which is simple in construction, light in weight, very strong, and capable of being manufactured at small cost.

The invention is illustrated in the accompanying drawing, wherein.

Figure 1:
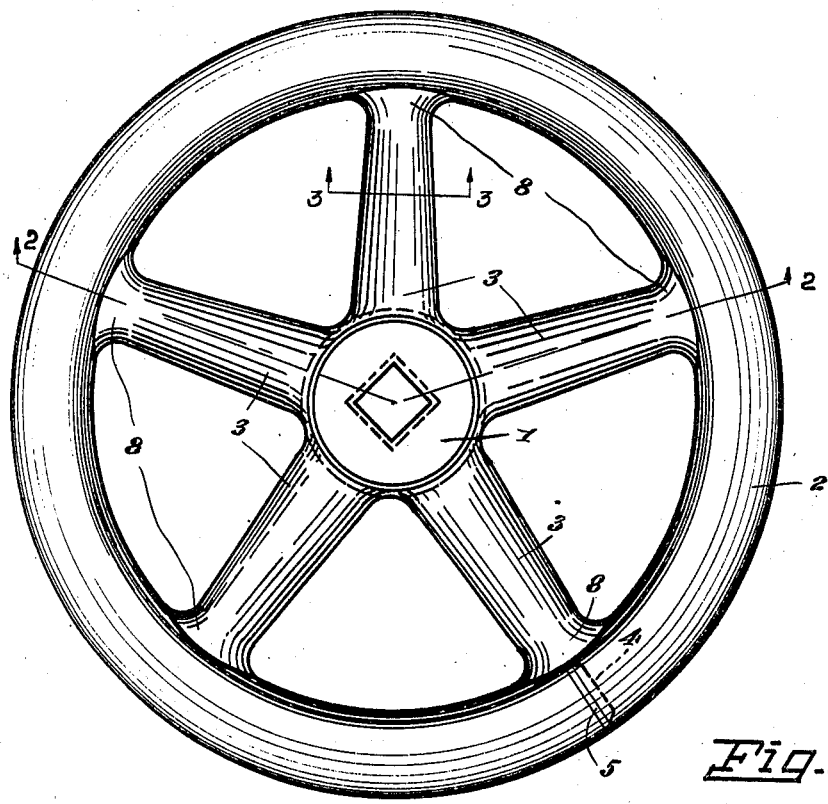
Figure 1 is a top plan view of the improved valve wheel.
Figure 2:
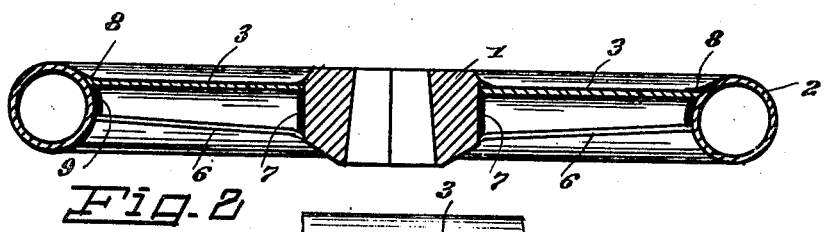
Figure 2 is a sectional view on the line 2—2 of Figure 1.

The valve wheel constituting the subject matter of this invention is formed of metal, such as steel, instead of brass or bronze, and has a hub 1, a rim 2, and spokes 3. While five spokes have been shown in the drawing, it is to be understood that any number found necessary may be employed.

The rim 2 is formed of resilient metal tubing which is of light weight but very strong, and, after the tube has been shaped to a circular configuration, the end of the tube having the inwardly rolled flange 4 about its extremity is snapped into the other end of the tube and a joint 5 formed by welding or brazing. Surplus welding metal is ground off after ends of the tube have been welded together, to form a smooth surface and eliminate an obstruction which would be liable to catch and tear the operator's hand when adjusting a valve.

Figure 3:
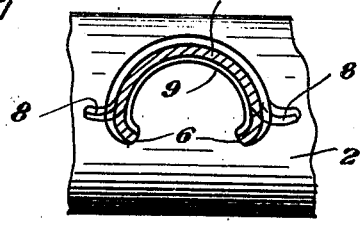
Figure 3 is a fragmentary sectional view on the line 3—3 of Figure 1.
Figure 4:
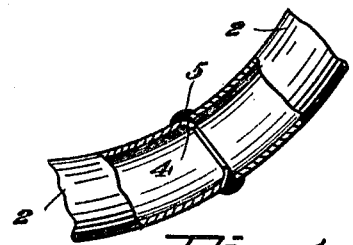
Figure 4 is a fragmentary view illustrating the formation of the welded joint for ends of the rim-forming tube.

The spokes 3, which are also formed of steel or other resilient sheet metal, are substantially semicircular in cross section, as shown in Figure 3, and extend radially between the hub and the rim with their concave surfaces presented downwardly and their convex surfaces upwardly. Side edge portions of the spokes are turned inwardly to form curved flanges 6 which impart added strength to the spokes and also permit them to be grasped when turning a large wheel, without the operator's fingers being cut by contact with edges of the spokes. Inner ends of the spokes are welded to the hub, as shown at 7, and outer ends 8 of the spokes are flared and firmly secured against the inner peripheral portion of the rim by welded joints 9. It will thus be seen that the spokes are firmly anchored at their ends to the hub and the rim and that sharp corners at ends of the spokes will be eliminated. Since the spokes and rims are formed of sheet metal, the wheel will be of light weight and formed of a minimum amount of metal, and since the rim is tubular and the spokes of channeled semicircular formation, the wheel will be very strong.

Having thus described the invention, what is claimed is:

A valve wheel comprising a hub having a stem-receiving socket, a circular rim of tubing, and spokes extending radially between the hub and the rim, said spokes being formed of sheet metal and of transversely arcuate concavo-convex formation in cross section with their convex surfaces uppermost, lower edge portions of side walls of the spokes being turned inwardly to form inwardly curving marginal portions at opposite sides of open under portions of the spokes, inner ends of the spokes being welded to sides of the hub and outer end portions of said spokes being flared outwardly and upwardly and terminating in arcuate end edges welded against inner side portions of the rim.

FRANK E. KOCHENDERFER.
CLARENCE V. SHRIVER.